United States Patent [19]

Zuleeg

[11] Patent Number: 4,518,255
[45] Date of Patent: May 21, 1985

[54] TEMPERATURE TRACKING RANGE FINDER

[75] Inventor: Rainer Zuleeg, San Juan Capistrano, Calif.

[73] Assignee: McDonnell Douglas Corporation, Long Beach, Calif.

[21] Appl. No.: 410,015

[22] Filed: Aug. 20, 1982

[51] Int. Cl.³ .............................................. G01C 3/08
[52] U.S. Cl. ......................................... 356/5; 250/552
[58] Field of Search .................. 356/5, 4; 343/5 CM; 372/98, 102, 46, 50; 350/96; 250/552

[56] References Cited

U.S. PATENT DOCUMENTS

| | | | |
|---|---|---|---|
| 3,082,283 | 3/1963 | Anderson | 136/89 |
| 3,771,873 | 11/1973 | Tourret | 356/4 |
| 3,778,157 | 12/1973 | Brelot et al. | 356/4 |
| 3,821,778 | 6/1974 | Kurtin | 357/30 |
| 3,896,473 | 7/1975 | DiLorenzo et al. | 357/15 |
| 3,937,575 | 2/1976 | Bateman | 356/5 |
| 3,940,608 | 2/1976 | Kissinger et al. | 356/4 |
| 3,973,216 | 8/1976 | Hughes et al. | 372/98 X |
| 3,991,383 | 11/1976 | Hughes | 372/102 X |
| 3,995,303 | 11/1976 | Nahory et al. | 357/30 |
| 4,025,194 | 5/1977 | Teppo | 356/4 X |
| 4,053,918 | 10/1977 | Fletcher et al. | 357/30 |
| 4,136,955 | 1/1979 | Aeschlimann et al. | 356/152 |
| 4,137,543 | 1/1979 | Beneking | 27/14 |
| 4,142,200 | 2/1979 | Mizushima et al. | 357/30 |
| 4,179,533 | 12/1979 | Christou et al. | 427/84 |
| 4,197,551 | 4/1980 | Adlerstein | 357/15 |
| 4,273,594 | 6/1981 | Heller et al. | 148/33.3 |
| 4,273,596 | 6/1981 | Gutierrez et al. | 148/171 |
| 4,278,830 | 7/1981 | Stirn et al. | 136/255 |
| 4,380,391 | 4/1983 | Buser et al. | 356/5 |
| 4,391,515 | 7/1983 | Forrester et al. | 356/5 |

Primary Examiner—S. C. Buczinski
Assistant Examiner—John B. Sotomayor
Attorney, Agent, or Firm—Gregory A. Cone; George W. Finch; Donald L. Royer

[57] ABSTRACT

The disclosed apparatus is a temperature tracking narrow band optical range finder which includes a prior art GaAs laser diode for emitting a laser energy pulse to a target and an improved GaAs avalanche detector for receiving a reflected pulse from the target. This range finder can be arranged in a single optical axis with the laser diode electrically shielded from the detector and the reflected pulse defocused so as to impinge on the detector area surrounding the laser diode, or it can be arranged by combining the emitted and reflected pulse in an interspersed fiber optical plane.

13 Claims, 11 Drawing Figures

TEMPERATURE TRACKING RANGE FINDER

BACKGROUND OF THE INVENTION

This invention relates to range finders and, more particularly, to a temperature tracking narrow band optical range finder which uses an improved GaAs avalanche detector to receive a reflected pulse from emitted photon energy directed toward a target.

An ultimate goal in the development of a laser self-detecting optical range finder is to use the same diode as an emitter and detector simultaneously. This is called a self-detecting laser diode. Such a diode would eliminate a detector, its support electronics, a spectral filter and a set of collecting optics. The state of development of this range finder appears to be premature for practical applications.

A self-detection mode of operation of a laser diode is shown and claimed in U.S. Pat. No. 3,937,575 issued Feb. 10, 1976 to Bateman. This method is only useful after a dead time of 100 to 200 nanoseconds, thereby restricting the range from 50 to 100 feet. For close ranging (5 to 10 feet), this method is impractical, even without dead time, due to electrical interference from high current pulses. Other arrangements are needed for pulse detection with acceptable sensitivity in the millivolt range.

In U.S. Pat. No. 4,142,200, issued Feb. 27, 1979 to Mizushima, et al., a structure is disclosed that produces a high avalanche gain near the junction interface due to a high electric field. In this patent such a structure is made of a silicon material, and no narrow band operation with high responsivity is claimed. An avalanche detector for receiving reflected signals from a target may be fabricated with silicon material using this patent teachings. However, it requires broadband filters to allow acceptance of a broad temperature tuning range (approximately 3 A/°K.) of a GaAs laser diode emission. Since the spectral response of a silicon detector is relatively flat, compared to a laser diode spectral emission, the usual way to achieve narrow band detection is in conjunction with an optical interference filter. The need for this filter introduces a limitation to the silicon detectors, such as the compromise between bandwidth and the use of a wide field of view and fast optics forced by the angle effects. Another limitation is that a larger bandwidth is required to accommodate the laser temperature tuning.

A prior art GaAs photodiode may be used as a detector in a range finder device; however, such a photodiode response decreases rapidly for wavelengths longer than 860 nanometers, hence, these photodiodes are not suitable for detection of room temperature GaAs laser diode emissions with typical peak wavelengths of 880 nanometers. The reason is that the detector response depends on band-to-band absorption while the laser diode emissions usually involve a band-to-acceptor transition. Thus, the laser diode emissions have significantly longer wavelengths than the threshold wavelength of the prior art GaAs detector. This difference in wavelength is more remarkable when higher operating temperatures of the laser diode are considered.

Therefore, it is an object of this invention to provide a temperature tracking optical range finder to be used at close range to a target.

Another object of this invention is to provide an improved narrow band self-filtering GaAs detector to this range finder.

A further object of this invention is to provide such an optical range finder to maintain, over a wide temperature range, the narrow band optical ranging capability while sustaining high sensitivity.

Still another object of this invention is to provide such an optical range finder with sufficient sensitivity so as to be capable of detecting weak pulses, such as reflections from diffuse targets.

SUMMARY OF THE INVENTION

This invention accomplishes these and other objects by providing a temperature tracking, narrow band optical range finder which has an improved GaAs avalanche photodiode detector to receive reflected signals from the target. This detector is an electroabsorption photodiode whose mode of operation is based on the Franz-Keldysh effect.

A detector structure using a Schottky barrier design is described, although to improve its noise characteristics two alternative structures using a PN-junction design are also described. All structures achieve minimum requirements in wavelength, bandpass, responsivity, rise time and other characteristics.

According to one embodiment of the invention, the optical range finder is arranged about a single optical axis with the laser diode electrically shielded from the detector. The reflected pulse is defocused and impinges on the detector area which surrounds the laser diode.

In an alternate embodiment, the emitted pulse of the laser diode and the reflected pulse at the detector is combined in an interspersed fiber optical plane where the separation of both pulses is readily achieved. Both embodiments use a single optical system as a transmitter/receiver of pulses.

The GaAs detector of the invention essentially duplicates the advantages of a self-detecting laser diode in the development of a sensitive short distance range finder without being inconsistent with the latest growth of the laser diode technology. The reason is that GaAs avalanche detectors are narrow band self-filtering (NBSF) detectors which depend on the same band gap physics as the laser diode in the determination of the operating wavelengths. In addition, the filtering action is due to quantum efficiency of photon absorption and carrier generation rather than the optical interference in multilayer coatings of the detector structure. Therefore, this detector is insensitive to the incident angles of the radiation. Furthermore, with this detector a narrow band background rejection is achieved over broad fields of view with fast collecting optics and broader temperature ranges. This detector will temperature tune and track the laser diode emitted pulse automatically using a narrow bandpass. Likewise, the embodiments of the invention require fewer elements since, with the use of GaAs detectors, the interference filters are eliminated. In summary, the benefits of a self-detecting laser diode are obtained with this NBSF GaAs detector by having better performance in the sensitivity, noise and electrical cross-coupling characteristics.

Further features and advantages of the present invention will become apparent from the detailed description and claims to follow, taken in conjunction with the accompanying drawings.

DETAILED DESCRIPTION OF THE INVENTION

Figure 1:
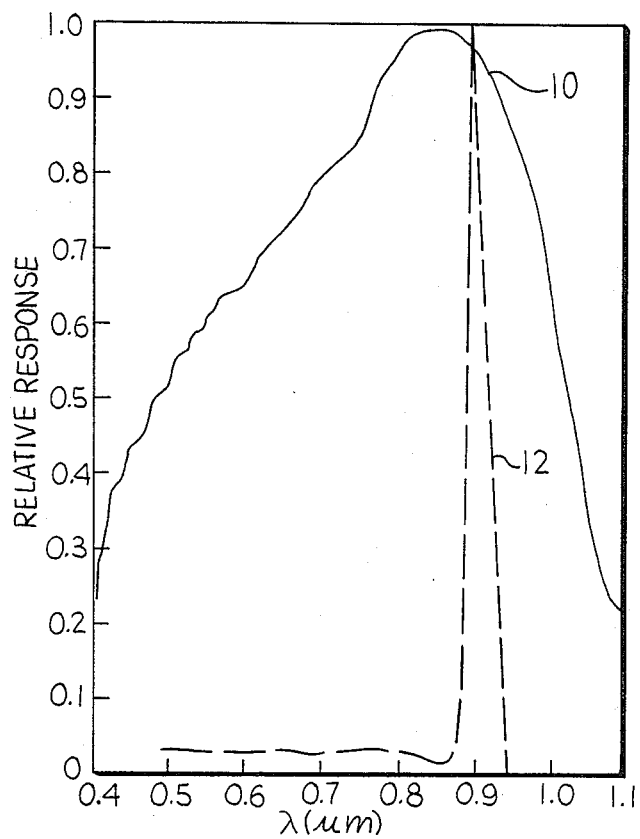
FIG. 1 is a graphical illustration of experimental spectral responses of a silicon P+N detector and a GaAs P+N detector.

In most prior art applications, a photodiode detector for wavelengths around 900 nanometers is built with high resistivity silicon material in a P/N structure. Referring to FIG. 1, since the spectral response 10 of a silicon detector is relatively flat for a laser diode spectral emission, the usual way to achieve a narrow band with such a detector is in conjunction with an optical interference filter. This will result in responsivities of 500 mA/W with a transmission efficiency of 90% at peak wavelength λp and an optical bandpass of about 300 Å. The need for an optical interference filter constitutes a limitation on a silicon detector which can be overcome by an improved narrowband self-filtering GaAs photodiode detector. The spectral response 12 of such a detector is shown in FIG. 1. Note the narrow bandpass of this detector.

Both the peak spectral emission of a GaAs laser diode and the peak spectral response of a prior art GaAs electroabsorption avalanche photodiode detector are governed by the same temperature dependence according to the following expression:

$$\lambda(T) = \frac{hc}{E_G(T)} = \frac{1240}{E_G(T)}$$

where h is the Planck's constant and c is the velocity of light. With the bandgap or photon energy, $E_G(T)$, in electron volts (eV), and the wavelength $\lambda(T)$ in nanometers (nm), for GaAs, with $E_G(300° K.) = 1.42$ eV and $E_G(0° K.) = 1.53$ eV, the value of temperature gradient is:

$$\frac{d\lambda}{dT} = 2.26 \text{Å}/°K. \text{ or } 0.226 \text{ nm}/°K.$$

At room temperature (300° K.) the GaAs bandgap is 1.42 eV with the absorption edge at $\lambda(300° K.) = 873$ nm. A laser diode emitting at 900 nm would have a photon energy of 1.37 eV which corresponds to a temperature of 320° K. Thus, over various laser operating conditions, such as power dissipation levels in the junction, it is very difficult to keep a typical laser spectral emissions of 5 to 10 nanometers of half-amplitude width tuned with a spectral response of 30 nanometers of half-amplitude width of the prior art GaAs photodetector, even though both have nearly the same temperature gradient.

Figure 2:
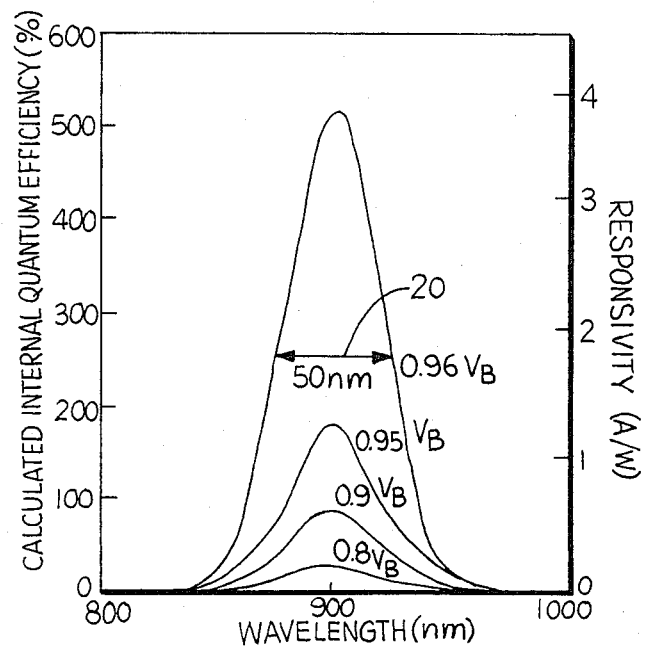
FIG. 2 is a graphical illustration of calculated internal quantum efficiency with avalanche gain with respect to pulse wavelength for an improved GaAs electroabsorption photodetector on a uniformly doped material of $N_D - N_A = 5 \times 10^{14}$ CM$^{-3}$ and varying bias voltage.

The improved GaAs electroabsorption avalanche photodiode detector has additional absorption beyond $\lambda = 870$ nm at room temperature because of the Franz-Keldysh effect. This effect means that the optimum response beyond this wavelength is caused by a higher ionization coefficient of holes than that of electrons in GaAs. The calculated internal quantum efficiency with avalanche gain, due to uneven ionization coefficients of holes and electrons, of an improved GaAs electroabsorption photodiode detector is shown in FIG. 2 for various bias voltages $V_B$. The half-amplitude bandwidth 20 of near 50 nanometers in value is shown also in FIG. 2. The calculated values of quantum efficiency with variations of bias voltages and wavelengths corresponds closely to those measured experimentally.

Figure 3:
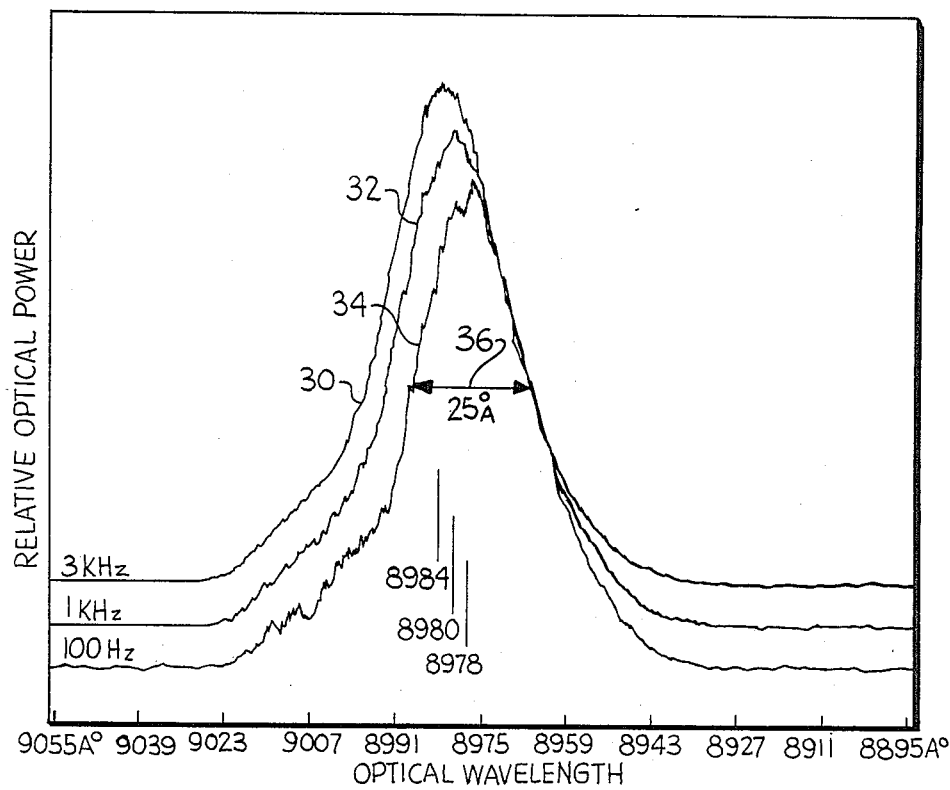
FIG. 3 is a graphical illustration of relative optical power with respect to optical wavelength for a GaAs laser diode.

FIG. 3 illustrates the change of peak wavelength in spectral emissions 30, 32, and 34 of a GaAs laser diode with pulse repetition rate, at frequencies of 3 KHZ, 1 KHZ and 100 HZ respectively. Peak power here is about 5 watts. Still referring to FIG. 3, although the half-amplitude spectral width 36 of 25Å does not change with frequency change, the peak wavelength changes from 8978 Å to 8984 Å. This corresponds to a laser diode internal temperature change of 2° K. for a temperature gradient $d\lambda/dT \simeq 3$ Å/°K. Ambient temperature changes is the primary cause of changes in laser emission wavelength.

Figure 4:
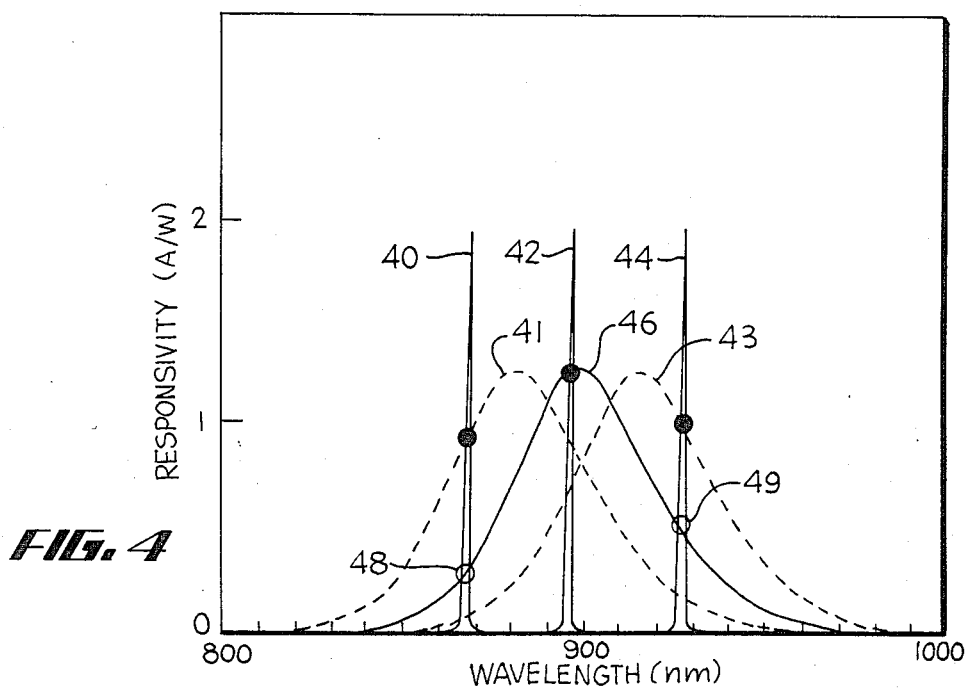
FIG. 4 is a graphical illustration of responsivity with respect to pulse wavelength illustrating the detector response tracking of the laser diode emitted pulses for temperatures of 200°, 300° and 400° K.

The laser diode spectral emission shown in FIG. 3 is plotted in FIG. 4, as 40, 42 and 44 for low temperature (200° K.), room temperature (300° K.) and high temperature (400° K.), respectively. The spectral emissions 40, 42 and 44 were calculated by using the temperature gradient $d\lambda/dT = 3$ Å/°K. The GaAs detector spectral response at 0.95 $V_B$, as shown in FIG. 2, is superimposed in FIG. 4 as 46 for room temperature (300° K.). If this detector is kept at 300° K. and the ambient temperature of the laser diode is changed to 200° K. and 400° K., which corresponds to 40 and 44 in FIG. 4, then the detector responsivities are reduced to about 0.3 and 0.5 A/W respectively. This is shown as 48 and 49 in FIG. 4. Because the photodiode detector is made of GaAs, its spectral response will track the spectral emission of the GaAs laser diode with respect to changes in temperature. This is shown in FIG. 4 as spectral responses 41 and 43 for 200° K. and 400° K. temperatures, respectively. The emission wavelength temperature gradient of the laser diode and the response wavelength temperature gradient of the photodiode detector of FIG. 4 are not the same. A value of temperature gradient of 1.5 Å/°K. was obtained for similar experimental photodiode detectors. Using this gradient value, the spectral responses 41 and 43 were plotted in FIG. 4. These responses demonstrate the temperature tracking capability of the invention. The laser diode/detector performance illustrated in FIG. 4 also demonstrates that the optical range finding capability of the invention works satisfactorily for ambient temperature changes between 200° K. and 400° K.

Figure 5:
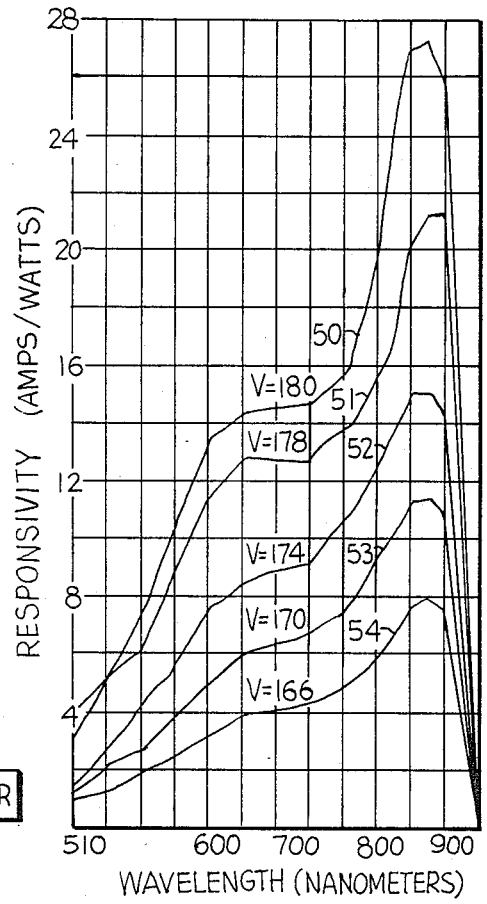
FIG. 5 is a graphic illustration of detector response with respect to pulse wavelength for an experimental improved GaAs avalanche detector.

FIG. 5 shows spectral responses 50, 51, 52, 53, and 54 of an experimental improved GaAs avalanche photodiode detector at different bias voltages. This device manifests the calculated GaAs avalanche characteristics shown in FIG. 2. The responsivity of the response 50 at a bias voltage of 180 volts is 27.3 A/watts which demonstrates the avalanche gain of this photodiode detector.

Figure 6A:
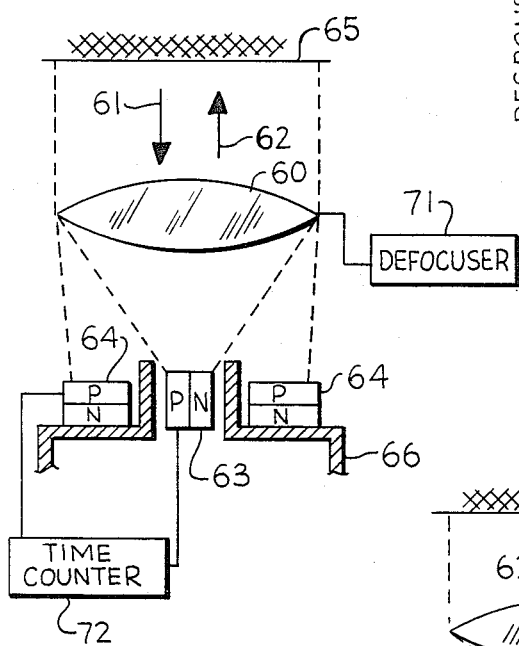
FIG. 6A and 6B are schematic diagrams of embodiments for a temperature tracking narrow band optical range finder.

One embodiment of the invention is shown schematically in FIG. 6A. This configuration is arranged on a single optical axis and uses an optical system 60 for transmitting and receiving a laser emitted pulse 62 and a reflected pulse 61. In this embodiment a laser diode 63 is electrically insulated by a shield 66 from a detector 64. The reflected pulse 61 coming from target 65 is defocused by defocuser 71 and impinges on the detector 64 area that surrounds the laser diode 63. A time counter 72 will start a time count when the emitted pulse 62 is emitted toward the target 65 by the laser diode 63. This time count will be stopped when the reflected pulse 61 is received by the detector 64. This time count then is converted to a distance measure response.

Figure 6B:
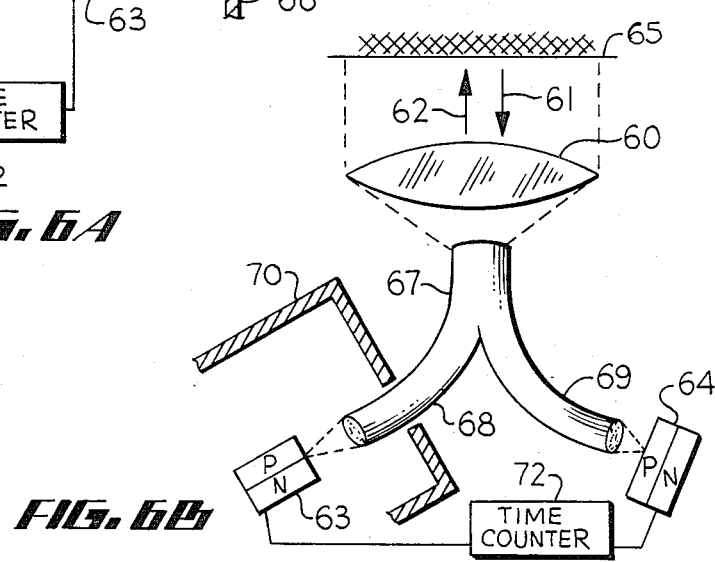

Another embodiment of the invention is shown schematically in FIG. 6B. This includes an interspersed fiber optical plane 67 with a fiber bundle 68 to transmit the laser emitted pulse 62 and a fiber bundle 69 to receive reflected pulse 61 coming from the target 65. The laser diode 63 is connected to the input side of the bundle 68 and the detector 64 is connected to the output side of the bundle 69. The laser diode 63 is shielded from the remaining elements of the embodiment by means of a shield 70. This configuration also uses the same optical system 60 for transmitting and receiving the emitted pulse 62 and the reflected pulse 61. This embodiment also uses the time counter 72 to perform the same functions as in the embodiment shown in FIG. 6A.

The improved GaAs avalanche photodiode detector characteristics should achieve the following minimum requirements to fulfill the objects of the invention:

| Response wavelength, $\lambda$ | $\sim$900 nm |
|---|---|
| Response bandpass, $\Delta\lambda$ | $\sim$50.0 nm |
| Responsivity, R | $\gtrsim$6 A/W |
| Rise Time $\tau$ | $\lesssim$2.5 ns |
| Noise, $NEI_D$ | $\lesssim 3 \times 10^{-13}$ A/Hz |
| Active Area | $\gtrsim$2 mm diameter |
| Bias Voltage, $V_B$ | $\lesssim$200 V |

Figure 7:
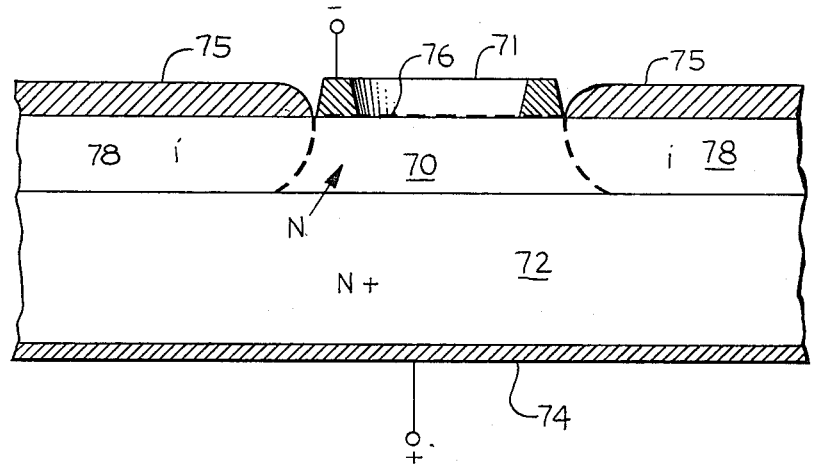
FIG. 7 is a partial cross-sectional view of the structure of a Schottky Barrier GaAs avalanche photodiode detector.

In order to accomplish this, the structure of a Schottky barrier electroabsorption avalanche photodiode detector, as shown in FIG. 7, is used. The calculated spectral response of this detector is shown in FIG. 2, which demonstrates the avalanche gain of such a structure. Referring again to FIG. 7, this structure is fabricated on an N-type layer 70, of high purity GaAs, grown epitaxially on an N+GaAs substrate 72. An ohmic contact 74 of AuGe eutectic alloy is formed on the backside of the substrate 72. A semitransparent Pt Schottky barrier contact 76, of about 100 to 200 Å thick, is electron-beam evaporated onto the upper surface of the epitaxial layer 70. A high resistivity i region 78, outside the epitaxial layer 70, is produced by selective proton bombardment. The region 78 is necessary to prevent edge breakdown at the perimeter of the planar structure. A gold ring contact 71 is provided to reduce the diode series resistance and to provide a terminal bond. An $Si_3N_4$ passivation layer 75 is formed over the i region 78. This detector diode has a diameter of 2 mm so that with the epitaxial layer 70 thickness of 25 μm the capacitance CD is $$C_D = \frac{\epsilon\epsilon_o A}{W} = 12.5 \text{ picofarads (pF)}$$

where $\epsilon\epsilon_o$ is the absolute dielectric constant of the semiconductor, A is the junction area and W is the depletion layer width of the diode.

Provided that the detector diode series resistance is smaller than 200 ohms, the RC time constant is 2.5 nanoseconds (ns). This time is small enough for an efficient detection of 10 nanoseconds laser signals. For this wide epitaxial layer 70 the transit time required for electron-hole pairs to be separated by drift in the junction depletion region is $$\tau = \frac{W}{2V_m} = 250 \text{ picoseconds}$$

where $V_m = 1 \times 10^7$ cm/s.

This indicates that the transit time will not impose response time constraints on the detector design. The RC time constant of the detector capacitance $C_D$ and the input impedance are the limiting factors. The punchthrough voltage for the 25 μm thick epitaxial layer 70 with $N_D - N_A = 10^{14}$ CM$^{-3}$ is $$V_p = \frac{q(N_D - N_A)W^2}{2\epsilon\epsilon_o} = 50 \text{ volts}$$

where q is the electron charge and where $N_D - N_A$ is the net impurity concentration. The narrow base breakdown voltage of the structure is approximately $BV = E_{MAX}W - V_P = 200$ volts with $E_{MAX} = 1 \times 10^5$ v/cm. Hence, the applied voltage for the detector to yield a responsivity of 1 A/W is 0.93 $V_B$ or about 180 volts.

With this structure, the detector noise level $NEP_D$ based on typical dark currents of $I_D = 100$ na, is given by $$NEP_D = \frac{h\nu}{\eta q} \sqrt{2qI_D}$$

where $\nu = C/\lambda$, c is the light velocity, $\lambda$ is the wavelength, q is the electronic charge and $\eta$ is the quantum efficiency. If the avalanche gain equivalent to $\eta = 3$ is available, or that responsivity is 2.1 A/W, then $$NEP_D = 3 \times 10^{-13} \text{ w}/\sqrt{\text{Hz}} \ .$$

Figure 8:
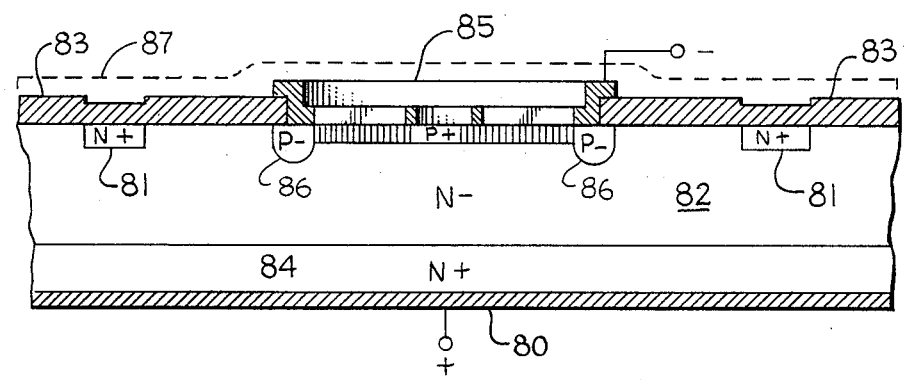
FIG. 8 is a partial cross-sectional view of the structure of a GaAs PN-junction electroabsorption photodetector.

To reduce the noise level of the photodiode detector, the Schottky barrier structure may be replaced by the PN-junction structure shown in FIG. 8. This will reduce the leakage currents and will increase the breakdown voltage at the periphery of the detector. Referring to FIG. 8, an N− layer 82 of 25 to 26 μm is grown by vapor phase or molecular beam epitaxy on an N+ substrate 84. The N− layer 82 should have a net impurity concentration $(N_D-N_A)$ of less than $10^{15}$ CM$^{-3}$, but preferably around $10^{14}$ CM$^{-3}$. A P− ring 86 surrounding a thin P+ region 88 provides a higher breakdown voltage at the periphery of the detector because of a deeper junction in the P− ring 86 of about 5 μm. This will allow a uniform avalanche multiplication in the center portion of the PN-junction structure. The deep P− ring 86 and the P+ region 88 are formed by Zn diffusion or by Mg+ ion implantation. An N+ ring 81 acts as a channel stopper to break up the depletion region outside the P− ring 86 due to the Fermi-level pinning at the surface of the GaAs adjacent to a Si$_3$N$_4$ passivation layer 83. To reduce the diode series resistance, a grid structure contact 85 is provided over the P+ region 88, the P− ring 86 and the passivation layer 83.

Figure 10:
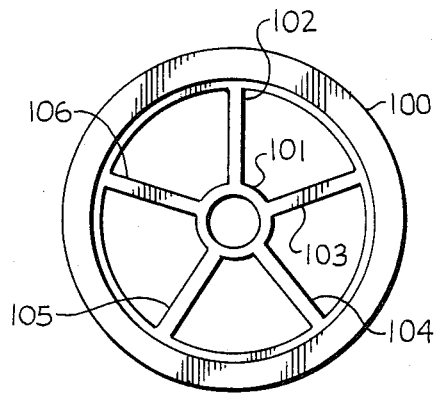
FIG. 10 is a schematic top view of a grid structure contact for the structure shown in FIG. 8.

The grid structure contact 85 may be formed by concentric rings 100 and 101 and by bars 102, 103, 104, 105, and 106 radially connecting the rings 100 and 101, as shown in FIG. 10.

The following are two sets of typical diffusion parameters of Zn used in the formation of the P− ring 86 and P+ region 88:

| DEPTH (μm) | SURFACE CONCENTRATION (CM$^{-3}$) | TEMPERATURE (°C.) | TIME (Min) |
|---|---|---|---|
| 5 | $5 \times 10^{19}$ | 650 | 60 |
| 1 | $5 \times 10^{19}$ | 650 | 10 |

It should be possible to replace both diffusions by ion implantation which could result in lower leakage currents. For the P− ring 86 it is desirable to use $B_e^+$, which is implanted at 150 Kev. For the P+ region 88, Mg+ or $B_e^+$ can be implanted at 100 Kev and 30 Kev respectively. A quarter-wavelength antireflection coating 87 can be deposited over the entire surface of the structure to increase the quantum efficiency of the detector by minimizing reflection losses at the surface. An ohmic contact 80 is used in this structure as the N+ electrode.

Figure 9:
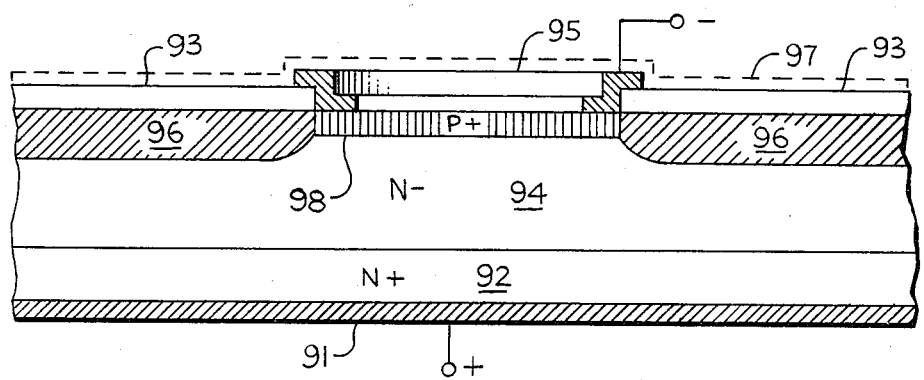
FIG. 9 is a partial cross-sectional view of the structure of an optimized GaAs PN-junction electroabsorption photodetector.

An optimized PN-junction structure is shown in FIG. 9. This will reduce considerably the detector capacitance. Referring to FIG. 9, an N− layer 94 is grown by vapor phase or molecular beam epitaxy on an N+ substrate 92. A P+ region 98 is formed either by Zn diffusion or by Mg+ ion implantation. A high resistivity i region 96 outside the P+ region 98 is produced by selective proton bombardment. The high resistivity i region 96 has a deeper penetration. An Si$_3$N$_4$ passivation layer 93 is formed over the i region 96. A gold ring contact 95 is also used in the structure to achieve low resistance. Gold contact 95 is adhered to P+ region 98 by means of a thin Pt evaporated layer. An ohmic contact 91 of AuGe is formed on the backside of the N+ substrate 92 to be used as the N+ electrode. An antireflection coating 97 can be deposited over the entire surface of the structure to increase the quantum efficiency of the detector by minimizing reflection losses at the surface.

What is claimed is:

1. Apparatus to find the range to a target, comprising:
   means for emitting pulsed, coherent photon energy directed toward the target, wherein the wavelength of the emitted pulse varies directly with the temperature of said emitter means comprising a Gallium Arsenide injection laser diode;
   means for detecting a reflected pulse of said photon energy traveling from the target functionally separate from said emitter means, wherein the peak spectral response of said detecting means substantially matches the peak spectral emission of said emitting means with varying temperatures within an effectively narrow band of wavelengths comprising a narrow band self-filtering Gallium arsenide electroabsorption avalanche photodiode detector;
   time counter means for measuring the elapsed time between the emission of the emitted pulse and the detection of the reflected pulse, and
   range calculating means to convert the elapsed time measure to a distance measure response.

2. Apparatus as recited in claim 1, further comprising:
   an optical means to receive the emitted pulse from said laser diode, optically transmitting said emitted pulse toward the target and optically transmitting said reflected pulse to said detector;
   a defocusing means associated with said optical means for defocusing said reflected pulse received by said optical means; and
   a shield means to insulate electrically said detector from said laser diode.

3. Apparatus as recited in claim 1, further comprising:
   an optical means to receive the emitted pulse from said laser diode, optically transmitting said emitted pulse toward the target and to receive the reflected pulse from the target, optically transmitting the reflected pulse to said detector;
   a first bundle of optical fibers connected on one end to said laser diode and connected on the other end to said optical means;
   a second bundle of optical fibers connected on one end to said detector and interspersedly connected with said first bundle to said optical means; and
   a shield means to separate said laser diode from said detector.

4. Apparatus as recited in claim 2, wherein said laser diode, said detector, said optical means and said shield are arranged on a single optical axis and wherein said detector is concentrically disposed around said laser diode.

5. Apparatus as recited in claim 1, wherein said photodiode detector comprises:
   an N+ GaAs substrate;
   an N-type layer of high purity GaAs grown on said substrate;
   a semitransparent Schottky barrier contact formed over said N-type layer;
   a high resistivity i region peripherally adjacent to said N-type layer so as to prevent edge breakdown at the boundary between said N-type layer and said i region;
   a ring contact means provided over said Schottky barrier contact and adjacent to the boundary between said N-type layer and said i region, so as to reduce the detector series resistance;
   an ohmic contact formed on the backside of said N+ substrate; and
   a passivation layer formed over said i region.

6. Apparatus as recited in claim 1, wherein said photodiode detector comprises:
   an N+ substrate;
   an N− layer grown on said N+ substrate;

a P+ region formed over said N− layer;

a P− ring surrounding said P+ region having a deeper junction with the underlying N-layer than said P+ region so as to provide higher breakdown voltage at the periphery of said detector; and an N+ ring formed over said N− layer concentrically with said P− ring and said $P^{30}$ region to act as a channel stopper to break up the depletion region formed outside said P− ring.

7. Apparatus as recited in claim 1, wherein said photodiode detector comprises:

an N+ substrate;

an N− layer grown on said N+ substrate;

a P+ region formed over said N− layer; and a high resistivity i region formed over said N− layer, concentrically with and adjacent to the external periphery of said P+ region.

8. Apparatus as recited in claim 5, wherein said ohmic contact comprises a AuGe eutetic alloy.

9. Apparatus as recited in claim 6, further comprising:

a passivation layer formed concentrically with said P− ring and over said N− ring layer, said N+ ring and said P− ring;

an antireflective coating deposited over the entire upper surface of the detector, so as to minimize reflection losses at the detector surface;

an ohmic contact formed on the backside of said N+ substrate; and a grid structure contact formed on the upper surface of the detector, so as to reduce the detector series resistance.

10. Apparatus as recited in claim 7, further comprising:

a passivation layer formed over said i region;

a ring contact means formed over said P+ region and said passivation layer, and adjacent to the internal periphery of said i region, so as to reduce the detector series resistance;

an ohmic contact formed on the backside of said N+ substrate; and an antireflective coating deposited over the entire upper surface of the photodiode detector, so as to minimize reflection losses at the detector surface.

11. Apparatus as recited in claim 9, wherein said grid structure contact comprises:

a first ring formed over said P− ring and said passivation layer, and concentrically with said N+ ring; and a second ring formed over said P+ region and concentrically with said first ring; and at least two bars radially disposed between and connecting said first and second rings and formed over said P+ region.

12. Apparatus as recited in claim 9, wherein said grid structure contact comprises gold.

13. Apparatus as recited in claim 5, wherein said Schottky barrier contact comprises platinum.

* * * * *